United States Patent
Kitagawa et al.

(10) Patent No.: US 8,283,591 B2
(45) Date of Patent: Oct. 9, 2012

(54) WELDING APPARATUS AND WELDING METHOD

(75) Inventors: Jun Kitagawa, Tochigi (JP); Toshiyuki Horimukai, Tochigi (JP); Junya Tanabe, Tochigi (JP); Shinya Oyama, Tochigi (JP); Kazunao Uchiyama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 607 days.

(21) Appl. No.: 12/593,390

(22) PCT Filed: Mar. 27, 2008

(86) PCT No.: PCT/JP2008/055960
§ 371 (c)(1),
(2), (4) Date: Sep. 28, 2009

(87) PCT Pub. No.: WO2008/120696
PCT Pub. Date: Oct. 9, 2008

(65) Prior Publication Data
US 2010/0126970 A1  May 27, 2010

(30) Foreign Application Priority Data

Mar. 30, 2007 (JP) ................................. 2007-093134

(51) Int. Cl.
*B23K 11/24* (2006.01)
(52) U.S. Cl. ............... 219/117.1; 219/86.51; 219/86.41; 219/91.21; 219/110; 219/119
(58) Field of Classification Search ................. 219/61.9, 219/86.31–33, 86.41, 86.51, 91.21, 109, 219/110, 117.1, 119
See application file for complete search history.

(56) References Cited

U.S. PATENT DOCUMENTS

| | | | | |
|---|---|---|---|---|
| 5,510,593 A | * | 4/1996 | Sakai | 219/86.7 |
| 5,582,747 A | * | 12/1996 | Sakai et al. | 219/86.41 |
| 5,866,868 A | * | 2/1999 | Hirane | 219/110 |
| 6,573,470 B1 | * | 6/2003 | Brown et al. | 219/86.51 |
| 7,432,466 B2 | * | 10/2008 | Spinella et al. | 219/110 |
| 2002/0053555 A1 | * | 5/2002 | Matsuyama | 219/110 |
| 2005/0024679 A1 | * | 2/2005 | Yoda et al. | 358/1.15 |
| 2012/0074104 A1 | * | 3/2012 | Goto et al. | 219/117.1 |

FOREIGN PATENT DOCUMENTS

| | | |
|---|---|---|
| JP | 62-127373 | 8/1987 |
| JP | 6-155037 | 6/1994 |
| JP | 11-047944 | 2/1999 |

* cited by examiner

*Primary Examiner* — Michael Lebentritt
(74) *Attorney, Agent, or Firm* — Rankin, Hill & Clark LLP

(57) ABSTRACT

A welding apparatus includes a first electrode tip; a second electrode tip opposing the first electrode tip; and an electrically conductive part which is provided so as to be freely interposed between the second electrode tip and a work and ensures electrical conduction between the second electrode tip and the work when the electrically conductive part is interposed between the second electrode tip and the work, the electrically conductive part including an electrically conductive member one side of which opposes the work with a presence of a void space from the work when the electrically conductive member is interposed between the second electrode tip and the work, and against which the second electrode tip is abutted on another side thereof, and a pair of electrically conductive abutment members which are provided integrally with the electrically conductive member in such a manner as to extend toward the work, and distal ends of which are abutted against the work, a position of abutment of the electrically conductive member against the second electrode tip being positioned between the pair of abutment members.

5 Claims, 4 Drawing Sheets

US 8,283,591 B2

WELDING APPARATUS AND WELDING METHOD

TECHNICAL FIELD

The present invention relates to a welding apparatus and a welding method for performing resistance welding by clamping a welding target portion of a work by a first electrode tip and a second electrode tip opposed to each other.

BACKGROUND ART

For instance, when a vehicle body of an automobile is manufactured, it is practiced to superpose a plurality of panel parts or the like, which are works, and to perform welding. In this type of welding, the use of a so-called welding gun is conventionally known which has a first electrode tip and a second electrode tip opposing the first electrode tip, whereby a welding target portion of a work is clamped in a pressurized state by the first electrode tip and the second electrode tip, and resistance welding is performed for the welding target portion (e.g., refer to JP-A-11-47944).

However, in a case where an obstacle portion such as a hollow portion is formed on the second electrode tip side of the welding target portion of the work, it is impossible to cause the second electrode tip to directly abut against the opposing side of the welding target portion against which the first electrode tip abuts. Accordingly, in this type of welding guns, one is known which is adapted to be able to move the second electrode tip in a direction of intersecting an opposing axis of the first electrode tip (e.g., refer to JP-A-6-155037). As a result, the second electrode tip can be abutted against the work by being offset from the position opposing the first electrode tip. Even if an obstacle portion such as a hollow portion is formed on the second electrode tip side of the welding target portion of the work, it is possible to ensure electrical conduction between the first electrode tip and the second electrode tip while avoiding the obstacle portion, so that it is possible to perform resistance welding to the welding target portion of the work against which the first electrode tip abuts.

However, in order to cause the second electrode tip to abut against the work by being offset from the position opposing the first electrode tip, the welding gun must be provided with an arrangement for moving the second electrode tip in the direction of intersecting the opposing axis of the first electrode tip. Namely, there are drawbacks in that not only does the construction of the welding gun become complex, but it becomes difficult to construct the welding gun compactly.

DISCLOSURE OF THE INVENTION

In one or more embodiments of the invention, there are provided a welding apparatus and a welding method in which when a welding target portion of the work is clamped by the first electrode tip and the second electrode tip opposed to each other, even if an obstacle portion such as a hollow portion is formed on the second electrode tip side of the welding target portion, resistance welding can be reliably performed to the welding target portion without needing to offset the second electrode tip from the position opposing the first electrode tip.

According to a first aspect of the invention, there is provided a welding apparatus comprising: a first electrode tip; a second electrode tip opposing the first electrode tip; and an electrically conductive part which is provided so as to be freely interposed between the second electrode tip and a work and ensures electrical conduction between the second electrode tip and the work when the electrically conductive part is interposed between the second electrode tip and the work, the electrically conductive part including an electrically conductive member one side of which opposes the work with a presence of a void space from the work when the electrically conductive member is interposed between the second electrode tip and the work, and against which the second electrode tip is abutted on another side thereof, and a pair of electrically conductive abutment members which are provided integrally with the electrically conductive member in such a manner as to extend toward the work, and distal ends of which are abutted against the work, a position of abutment of the electrically conductive member against the second electrode tip being positioned between the pair of abutment members.

According to a second aspect of the invention, in the construction of the welding apparatus according to the above-described first aspect, the electrically conductive member includes a supporting member for supporting the electrically conductive member, wherein the supporting member swingably supports the electrically conductive member through a swinging shaft provided at a position corresponding to an interval between the both abutment members, and the both abutment members are movable in an opposing direction toward the work in consequence of the swinging motion of the electrically conductive member.

According to a third aspect of the invention, in the construction of the welding apparatus according to the above-described first or second aspect, the electrically conductive part causes the both abutment members to be brought into pressure contact with the work when the electrically conductive part is interposed between the second electrode tip and the work.

According to a fourth aspect of the invention, there is provided a welding method for performing resistance welding to a plurality of welding target portions by clamping a work by a first electrode tip and a second electrode tip opposed to the first electrode tip, comprising: an electrically conductive portion abutment step of causing an electrically conductive part for ensuring electrical conduction between the second electrode tip and the work to be interposed between the second electrode tip and the work, of causing one side of an electrically conductive member provided in the electrically conductive part to oppose the work with a presence of a predetermined distance therebetween, and of causing distal ends of a pair of abutment members extending from the electrically conductive member toward the work to abut against the work; a first welding step of causing the first electrode tip to abut against a first welding target portion of the work positioned in a central portion between the both abutment members and of simultaneously causing the second electrode tip to abut against another side of the electrically conductive member in an opposing relation to the first electrode tip, to thereby weld the first welding target portion and form a first weld; a second welding step of causing the first electrode tip to abut against a second welding target portion of the work positioned between the first weld and one of the abutment members and of simultaneously causing the second electrode tip to abut against the another side of the electrically conductive member in the opposing relation to the first electrode tip, to thereby weld the second welding target portion and form a second weld; and a third welding step of causing the first electrode tip to abut against a third welding target portion of the work positioned between the first weld and another one of the abutment members and of simultaneously causing the second electrode tip to abut against the another side of the electrically conductive member in the opposing relation to the first electrode tip, to thereby weld the third welding target portion and form a third weld.

According to the first aspect of the invention, the welding apparatus clamps a welding target portion of the work by the first electrode tip and the second electrode tip. At this time, in a case where an obstacle portion such as a hollow portion is formed on the second electrode tip side of the welding target portion of the work, the electrically conductive part is interposed between the second electrode tip and the work prior to the clamping of the work by the first electrode tip and the second electrode tip. Since the electrically conductive member of the electrically conductive part opposes the work with the presence of a void space from the work, the obstacle portion can be accommodated in this void space. Further, since the both abutment members are spaced apart from each other, the obstacle portion can be accommodated between the both abutment members. In addition, the distal ends of the both abutment members are abutted against the work, and the first electrode tip is abutted against a welding target portion of the work, while the second electrode tip is abutted against the electrically conductive member of the electrically conductive part. By so doing, the first electrode tip and the second electrode tip are set in the state of clamping the welding target portion of the work through the electrically conductive part. At this time, since the state of electrical conduction is ensured for the second electrode tip and the work by the both abutment members and the electrically conductive member, the welding target portion of the work against which the first electrode tip is abutted can be subjected to resistance welding.

Thus, according to the welding apparatus in accordance with the invention, even if an obstacle portion such as a hollow portion is formed on the second electrode tip side of the welding target portion of the work, the welding target portion of the work can be subjected to resistance welding by the first electrode tip and the second electrode tip opposed to each other by merely ensuring electrical conduction by interposing the electrically conductive member between the second electrode tip and the work.

According to the second aspect of the invention, even if the surface of the work against which the both abutment members are abutted is inclined, the both abutment members can be abutted uniformly along the surface of the work. As a result, electrical conduction can be reliably ensured with respect to the work.

According to the third aspect of the invention, since the both abutment members are brought into pressure contact with the work by the pressurizing means, the both abutment members can be reliably abutted against the work. As a result, it is possible to reliably prevent the adhesion of the abutment members with respect to the work due to an insufficiently abutted state.

According to the fourth aspect of the invention, in the above-described first welding step, the first electrode tip is abutted against the first welding target portion of the work positioned in the central portion (position in a substantial center) between the both abutment members, and the second electrode tip is abutted against the electrically conductive member in an opposing relation to the first electrode tip. As a result, the respective abutment members are positioned at equal distances from the first electrode tip, so that an electric current flows uniformly between the first electrode tip and the respective one of the abutment members. Hence, it is possible to prevent the concentration of the electric current on either one of the abutment members and prevent the adhesion between each abutment member and the work, and it is possible to satisfactorily form the first weld.

Next, in the above-described second welding step, the first electrode tip is abutted against the second welding target portion of the work positioned between the first weld and one abutment member, and the second electrode tip is abutted against the electrically conductive member in the opposing relation to the first electrode tip. At this time, the one abutment member is at a position close to the first electrode tip, while the other abutment member is at a position remote from the first electrode tip. However, since a nugget is formed in the first weld due to the above-described first welding step, a smooth flow of electric current has already been ensured. As a result, it is possible to prevent the concentration of the electric current on the one abutment member and prevent the adhesion between the abutment member and the work, and it is possible to satisfactorily form the second weld.

Subsequently, in the above-described third welding step, the first electrode tip is abutted against the third welding target portion of the work positioned between the first weld and the other abutment member, and the second electrode tip is abutted against the electrically conductive member in the opposing relation to the first electrode tip. In this case as well, the one abutment member is at a position remoter from the first electrode tip than the other abutment member. However, between the first electrode tip and the one abutment member located at the remote position, nuggets have been formed in the first weld through the above-described first welding step and in the second weld through above-described second welding step, so that the flow of electric current has been ensured sufficiently. As a result, it is possible to prevent the concentration of the electric current on the other abutment member and prevent the adhesion between the abutment member and the work, and it is possible to satisfactorily form the third weld.

The other features and advantages will be apparent from the description of the embodiment and the appended claims.

BEST MODE FOR CARRYING OUT THE INVENTION

Figure 1:
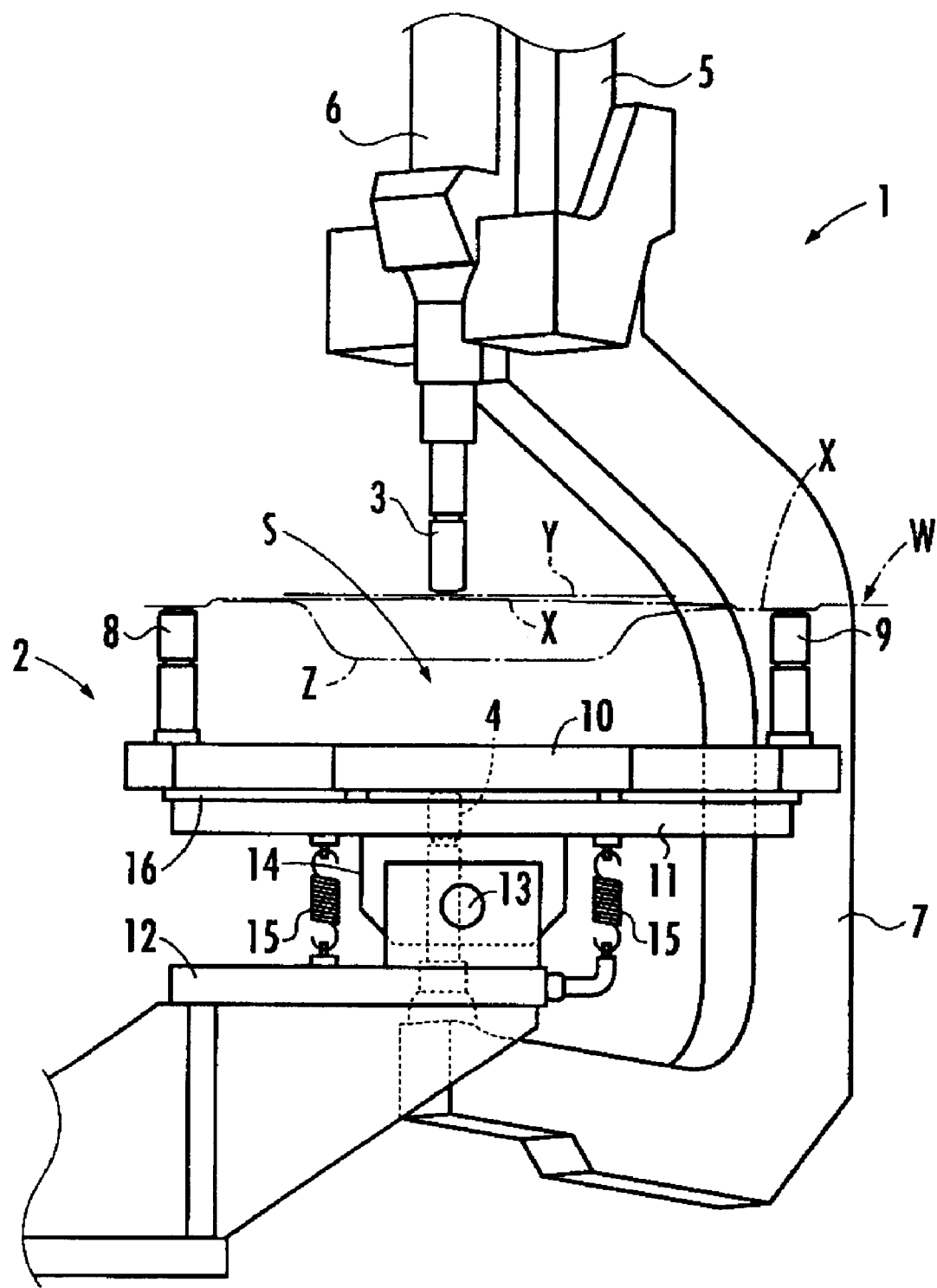
FIG. 1 is an explanatory diagram illustrating a construction of essential portions of a welding apparatus in accordance with an embodiment of the invention.
Figure 2:
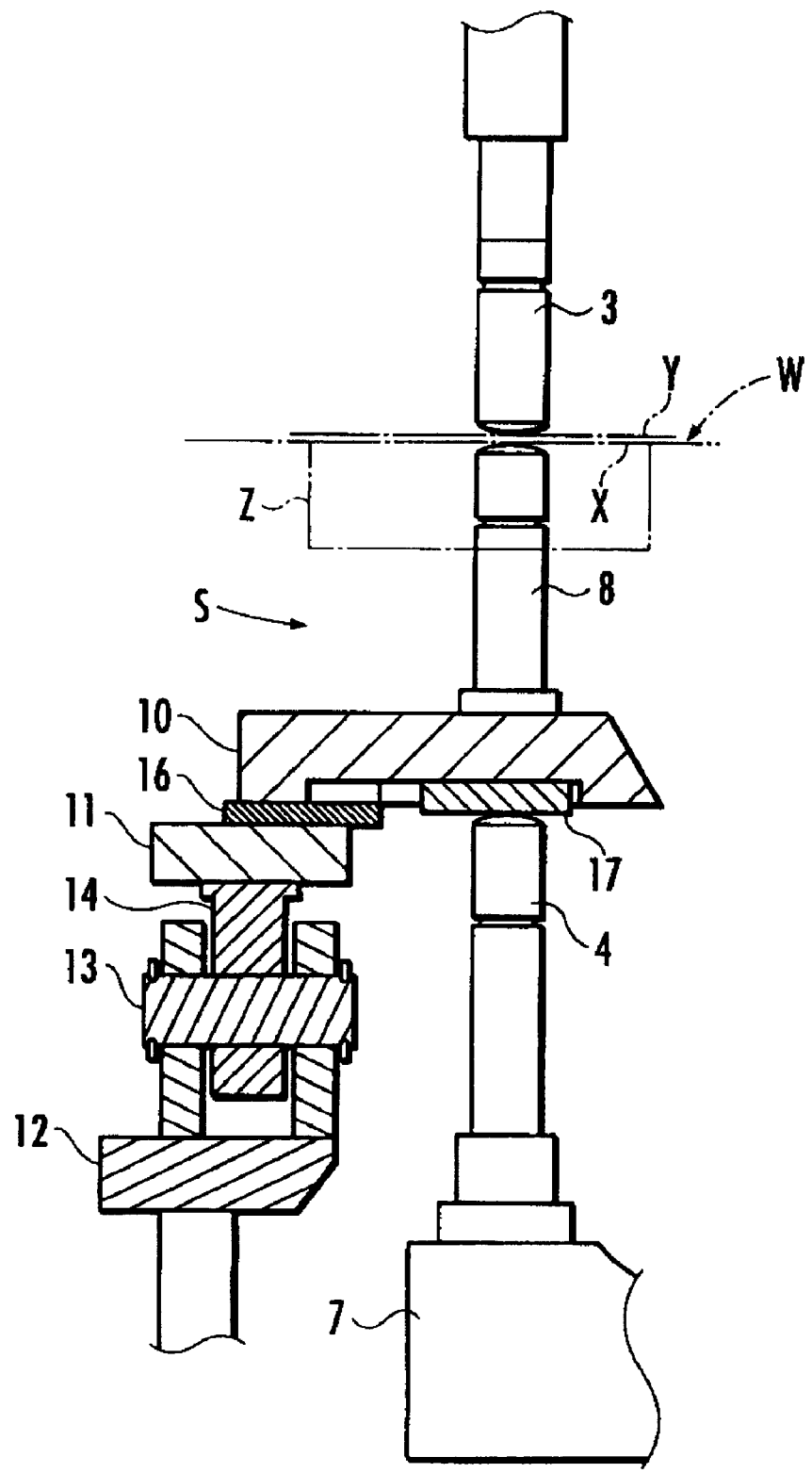
FIG. 2 is an explanatory cross-sectional view of the welding apparatus in accordance with the embodiment.

A description of an embodiment of the present invention will be given on the basis of drawings. FIG. 1 is an explanatory diagram illustrating a construction of essential portions of a welding apparatus in accordance with the embodiment. FIG. 2 is an explanatory cross-sectional view of the welding apparatus in accordance with the embodiment. FIGS. 3A to 3D are explanatory diagrams illustrating a welding operation using the welding apparatus in accordance with the embodiment.

As shown in FIGS. 1 and 2, the welding apparatus in accordance with a exemplary embodiment of the invention is constituted by a welding gun 1 and an electrically conductive part 2. It should be noted that a work W which is subjected to welding in the embodiment is one in which another panel part Y is superposed on an upper surface side of a panel part X serving as a base, and the panel part X integrally has a hollow portion Z on its lower side. The welding apparatus in accordance with the embodiment welds the other panel part Y onto the panel part X located above the hollow portion Z, as will be described later.

The welding gun 1, which is partially shown in FIGS. 1 and 2, has a known construction and includes a first electrode tip 3 and a second electrode tip 4 (see FIG. 2) to which electric power is fed. The first electrode tip 3 is attached to a distal end of a supporting rod 6 supported advanceably and retractably by a connecting frame 5 which is connected to a not illustrated robot arm. The second electrode tip 4 is supported by the connecting frame 5 through an arm portion 7. The arm portion 7 is connected advanceably and retractably to the connecting frame 5, and the first electrode tip 3 and the second electrode tip 4 are provided such that their axes are aligned with each other and their tips are opposed to each other. The supporting rod 6 and the arm portion 7 are moved by a not illustrated advancing/retracting means in directions in which the first electrode tip 3 and the second electrode tip 4 are moved into abutment with or away from each other. As a result, the arrangement provided is such that the work W can be clamped by the first electrode tip 3 and the second electrode tip 4, and in this state the first electrode tip 3 and the second electrode tip 4 are energized to effect the resistance welding of the work W.

As shown in FIG. 1, the electrically conductive part 2 has a pair of abutment members 8 and 9 on its upper surface side (the side opposing the work W). The both abutment members 8 and 9 are provided integrally on one side of an electrically conductive member 10 in such a manner as to extend toward the work W. The both abutment members 8 and 9 and the electrically conductive member 10 are each formed of an electrically conductive material such as a metal, and are made electrically conductive with each other. The both abutment members 8 and 9 are provided in mutually spaced-apart relation, and distal ends of the both abutment members 8 and 9 abut against the panel part X on both sides of the hollow portion Z of the work W while avoiding that hollow portion Z. Meanwhile, the electrically conductive member 10 is positioned with a presence of a void space S from the work W by means of the both abutment members 8 and 9 when the distal ends of the both abutment members 8 and 9 are abutted against the work W, and the hollow portion Z of the work W is accommodated in this void space S. As a result, the both abutment members 8 and 9 and the electrically conductive member 10 are adapted so as not to interfere with the hollow portion Z of the work W.

In addition, as shown in FIGS. 1 and 2, the electrically conductive member 10 is supported by a supporting member 12 through a connecting member 11 which is fixedly provided on its lower surface side (the side opposite to the side where the both abutment members 8 and 9 are provided). The supporting member 12 has a swinging shaft 13, and the connecting member 11 of the electrically conductive member 10 has a bearing 14 which is swingably connected to that swinging shaft 13. The bearing 14 of the connecting member 11 is provided at a position corresponding to a substantially center between the both abutment members 8 and 9. Since the electrically conductive member 10 is made swingable through the connecting member 11, the both abutment members 8 and 9 are movable in the opposing direction toward the work W. Hence, when the distal ends of the both abutment members 8 and 9 are abutted against the panel part X of the work W, the electrically conductive member 10 is swung in correspondence with the inclination and shape of the panel part X, so that the distal ends of the both abutment members 8 and 9 can be reliably abutted along the panel part X of the work W.

Furthermore, spring members 15 are provided at each both side position of the swinging shaft 13 and are adapted to maintain the electrically conductive member 10 in a predetermined posture until the distal ends of the both abutment members 8 and 9 abut against the work W. In addition, the supporting member 12 is connected to an not illustrated robot arm or the like through a pressure contact means such as a cylinder. After causing the distal ends of the both abutment members 8 and 9 to abut against the work W, the pressure contact means causes the distal ends of the both abutment members 8 and 9 to be brought into pressure contact with the work W through the supporting member 12 and the electrically conductive member 10.

As shown in FIG. 2, the connecting member 11 is provided along one side edge of the electrically conductive member 10, and is integrally connected to the electrically conductive member 10 through an insulating member 16. Further, an electrode abutment portion 17, against which the second electrode tip 4 abuts, is provided on the lower surface side of the electrically conductive member 10. The electrode abutment portion 17 is provided integrally with the electrically conductive member 10 and is electrically conductive so as to be electrically conductable with the electrically conductive member 10.

Figure 3A:
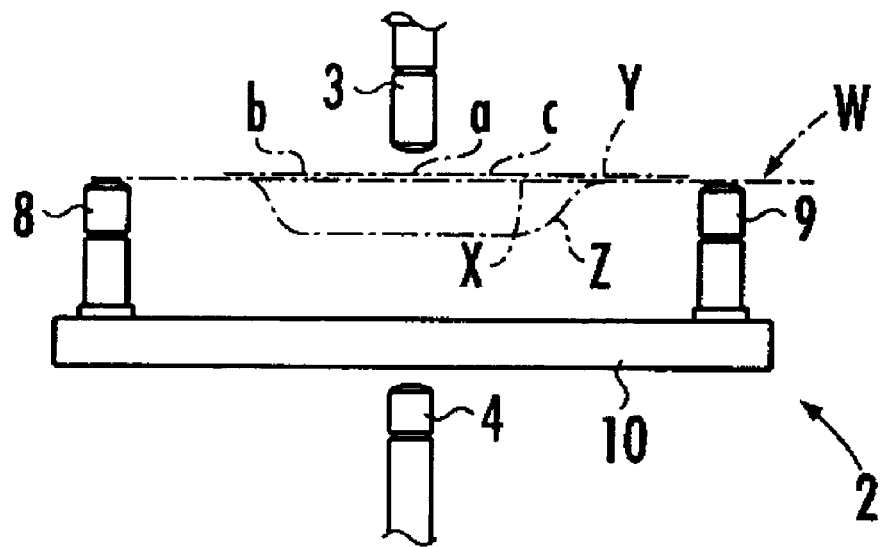
FIG. 3A is an explanatory diagram illustrating a welding operation using the welding apparatus in accordance with the embodiment.

Next, a description will be given of the welding operation of the work W by the welding apparatus in accordance with the embodiment constructed as described above. The work W, which is subjected to welding in this embodiment, is provided with the hollow portion Z on the lower side of the panel part X serving as a base, as described above. As shown in FIG. 3A, the other panel part Y superposed at a position immediately above the hollow portion Z is welded to the upper surface of the panel part X through three welding target portions (a first welding target portion a, a second welding target portion b, and a third welding target portion c) by the welding apparatus of the embodiment.

First, as shown in FIG. 3A, when the first electrode tip 3 is positioned above the work W, and the second electrode tip 4 opposing the first electrode tip 3 is positioned below the work W, the electrically conductive member 10 is interposed between the second electrode tip 4 and the work W. Next, the distal ends of the respective abutment members 8 and 9 are abutted against the both side positions of the hollow portion Z of the work W (electrically conductive portion abutment step). At this time, the abutment members 8 and 9 are abutted against the panel part X on both sides of the hollow portion Z of the work W while avoiding that hollow portion Z. Further, the distal ends of the both abutment members 8 and 9 are brought into pressure contact with the panel part X of the work W by the aforementioned pressurizing means, thereby reliably maintaining the state of electrical conduction between the panel part X and the both abutment members 8 and 9.

Figure 3B:
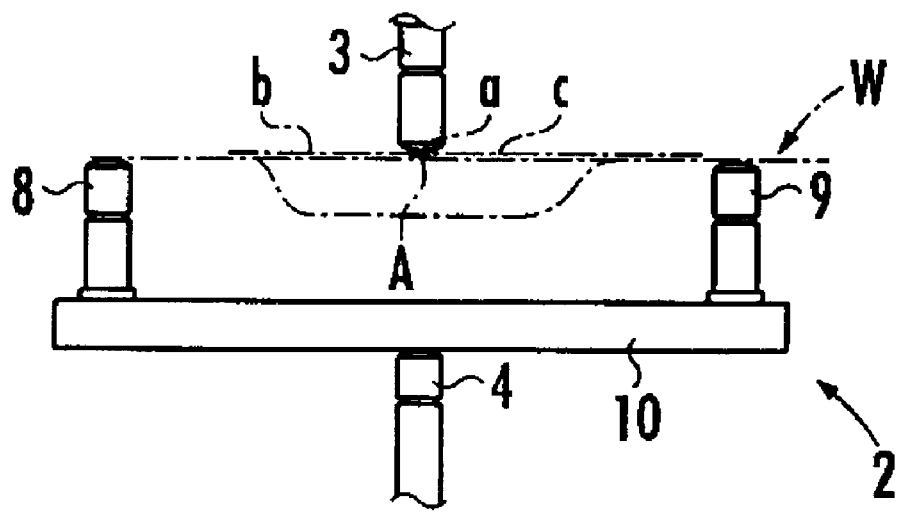
FIG. 3B is an explanatory diagram illustrating the welding operation using the welding apparatus in accordance with the embodiment.

Subsequently, as shown in FIG. 3B, the first electrode tip 3 is abutted against the first welding target portion a which is at the center between the positions where the distal ends of the both abutment members 8 and 9 abut in the panel part Y of the work W. At the same time, the second electrode tip 4 opposing the first electrode tip 3 is abutted against the electrode abutment portion 17 of the electrically conductive member 10. Then, a first weld A is formed at the first welding target portion a by the energization of the both electrode tips 3 and 4 (first welding step). Since the first welding target portion a is at the center between the positions where the distal ends of the both abutment members 8 and 9 abut, the respective abutment members 8 and 9 are positioned at equal distances from the first electrode tip 3. As a result, an electric current flows uniformly between the first electrode tip 3 and the respective one of the abutment members 8 and 9, so that it is possible to prevent the concentration of the electric current on either one of the both abutment members 8 and 9.

Figure 3C:
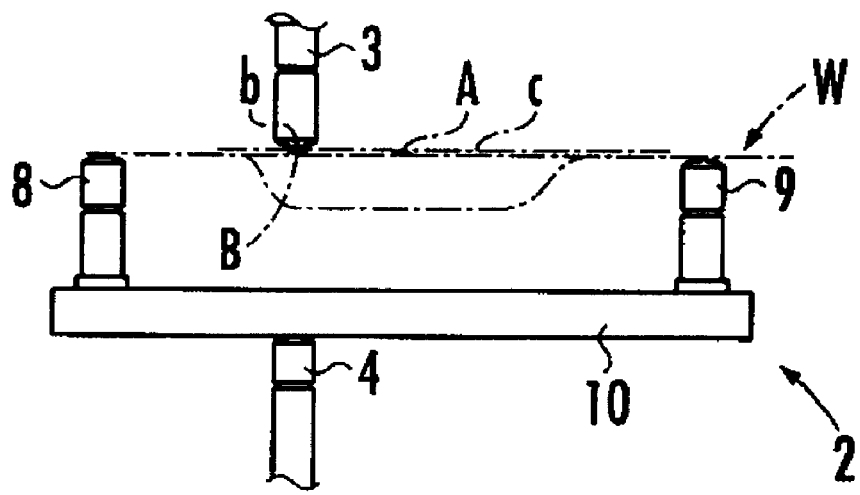
FIG. 3C is an explanatory diagram illustrating the welding operation using the welding apparatus in accordance with the embodiment.

Next, as shown in FIG. 3C, the first electrode tip 3 is abutted against the second welding target portion b which is on the one abutment member 8 side in the panel part Y of the work W. At the same time, the second electrode tip 4 opposing the first electrode tip 3 is abutted against the electrode abutment portion 17 of the electrically conductive member 10. Then, a second weld B is formed at the second welding target portion b by the energization of the both electrode tips 3 and 4 (second welding step). Although the second welding target portion b is located between the first weld A and the position where the distal end of the one abutment member 8 abuts, since a nugget (not shown) due to welding has already been formed in the first weld A, electrical conduction between the both panel parts X and Y is allowed to take place smoothly. As a result, the concentration of the electric current from the first electrode tip 3 to the one abutment member 8 is alleviated, thereby making it possible to prevent the adhesion between the one abutment member 8 and the panel part X.

Figure 3D:
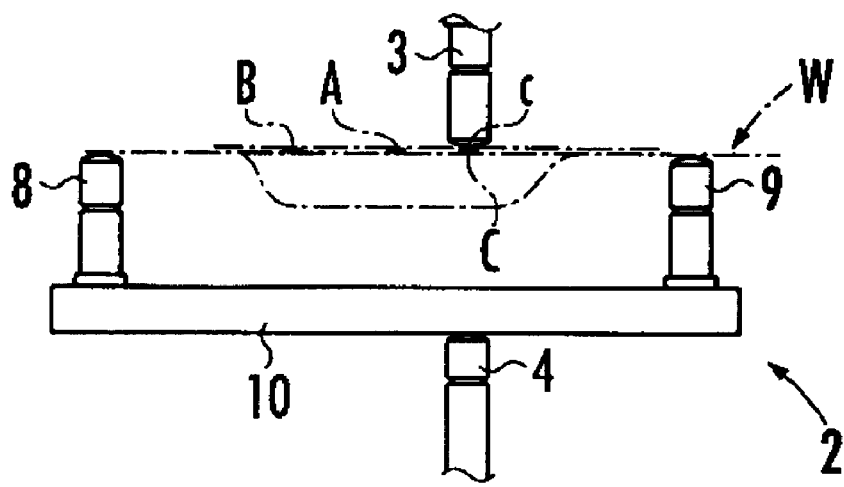
FIG. 3D is an explanatory diagram illustrating the welding operation using the welding apparatus in accordance with the embodiment.

Subsequently, as shown in FIG. 3D, the first electrode tip 3 is abutted against the third welding target portion c which is on the other abutment member 9 side in the panel part Y of the work W. At the same time, the second electrode tip 4 opposing the first electrode tip 3 is abutted against the electrode abutment portion 17 of the electrically conductive member 10. Then, a third weld C is formed at the third welding target portion c by the energization of the both electrode tips 3 and 4 (third welding step). Although the third welding target portion c is located between the first weld A and the position where the distal end of the other abutment member 9 abuts, since nuggets (not shown) due to welding have already been formed in the first weld A and the second weld B, electrical conduction between the both panel parts X and Y is carried out sufficiently. As a result, the concentration of the electric current from the first electrode tip 3 to the other abutment member 9 is reliably prevented, thereby making it possible to prevent the adhesion between the other abutment member 9 and the panel part X.

Although the present invention has been described in detail with reference to the specific embodiment, it will be obvious to those skilled in the art that various changes and modifications may be made thereto without departing from the spirit and scope of the invention.

This application is based on Japanese Patent Application filed on Mar. 30, 2007 (Japanese Patent Application No. 2007-093134), the contents of which are incorporated herein by reference.

The invention claimed is:

1. A welding apparatus comprising:
a first electrode tip;
a second electrode tip opposing the first electrode tip; and
an electrically conductive part which is provided so as to be freely interposed between the second electrode tip and a work and ensures electrical conduction between the second electrode tip and the work when the electrically conductive part is interposed between the second electrode tip and the work,
wherein the electrically conductive part includes an electrically conductive member one side of which opposes the work with a presence of a void space from the work when the electrically conductive member is interposed between the second electrode tip and the work, and against which the second electrode tip is abutted on another side thereof, and a pair of electrically conductive abutment members which are provided integrally with the electrically conductive member in such a manner as to extend toward the work, and distal ends of which are abutted against the work, and
wherein a position of abutment of the electrically conductive member against the second electrode tip is positioned between the pair of abutment members.

2. The welding apparatus according to claim 1, wherein the electrically conductive member includes a supporting member for supporting the electrically conductive member, and
wherein the supporting member swingably supports the electrically conductive member through a swinging shaft provided at a position corresponding to an interval between the both abutment members, and
the both abutment members are movable in an opposing direction toward the work in consequence of the swinging motion of the electrically conductive member.

3. The welding apparatus according to claim 1, wherein the electrically conductive part causes the both abutment members to be brought into pressure contact with the work when the electrically conductive part is interposed between the second electrode tip and the work.

4. The welding apparatus according to claim 2, wherein the electrically conductive part causes the both abutment members to be brought into pressure contact with the work when the electrically conductive part is interposed between the second electrode tip and the work.

5. A welding method for performing resistance welding to a plurality of welding target portions by clamping a work by a first electrode tip and a second electrode tip opposed to the first electrode tip, comprising:
an electrically conductive portion abutment step of causing an electrically conductive part for ensuring electrical conduction between the second electrode tip and the work to be interposed between the second electrode tip and the work, of causing one side of an electrically conductive member provided in the electrically conductive part to oppose the work with a presence of a predetermined distance therebetween, and of causing distal ends of a pair of abutment members extending from the electrically conductive member toward the work to abut against the work;
a first welding step of causing the first electrode tip to abut against a first welding target portion of the work positioned in a central portion between the both abutment members and of simultaneously causing the second electrode tip to abut against another side of the electrically conductive member in an opposing relation to the first electrode tip, to thereby weld the first welding target portion and form a first weld;
a second welding step of causing the first electrode tip to abut against a second welding target portion of the work positioned between the first weld and one of the abutment members and of simultaneously causing the second electrode tip to abut against the another side of the electrically conductive member in the opposing relation to the first electrode tip, to thereby weld the second welding target portion and form a second weld; and a third welding step of causing the first electrode tip to abut against a third welding target portion of the work positioned between the first weld and another one of the abutment members and of simultaneously causing the second electrode tip to abut against the another side of the electrically conductive member in the opposing relation to the first electrode tip, to thereby weld the third welding target portion and form a third weld.

* * * * *